United States Patent
Sinha (10) Patent No.: US 10,908,404 B2
(45) Date of Patent: Feb. 2, 2021

(54) PATTERNED OPTIC FOR EPI-FLUORESCENCE COLLECTION

(71) Applicant: Verily Life Sciences LLC, Mountain View, CA (US)

(72) Inventor: Supriyo Sinha, Menlo Park, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 246 days.

(21) Appl. No.: 15/945,230

(22) Filed: Apr. 4, 2018

(65) Prior Publication Data

US 2018/0292635 A1    Oct. 11, 2018

Related U.S. Application Data

(60) Provisional application No. 62/482,744, filed on Apr. 7, 2017.

(51) Int. Cl.
*G02B 21/00* (2006.01)
*G02B 21/26* (2006.01)
(Continued)

(52) U.S. Cl.
CPC ........ *G02B 21/0032* (2013.01); *G01J 3/0208* (2013.01); *G01J 3/0229* (2013.01);
(Continued)

(58) Field of Classification Search
CPC .... G02B 21/365; G02B 21/06; G02B 21/361; G02B 21/16; G02B 21/24; G02B 21/241;
(Continued)

(56) References Cited

U.S. PATENT DOCUMENTS

| 5,896,224 A | 4/1999 | Kapitza |
| 2004/0031930 A1 | 2/2004 | Wolleschensky et al. |

(Continued)

FOREIGN PATENT DOCUMENTS

| JP | 2003-248175 A | 9/2003 |
| JP | 2013-101124 A | 5/2013 |

(Continued)

OTHER PUBLICATIONS

International Search Report and Written Opinion, dated Jul. 5, 2018, from International Patent Application No. PCT/US2018/026043.
(Continued)

*Primary Examiner* — Collin X Beatty
*Assistant Examiner* — Grant A Gagnon
(74) *Attorney, Agent, or Firm* — McDonnell Boehnen Hulbert & Berghoff LLP (57) ABSTRACT

The present disclosure relates to systems and methods for epi-fluorescence collection. An example system includes an optical element, one or more light sources, and an image sensor. The optical element includes at least one high reflectivity (HR) coating portion and at least one anti-reflection (AR) coating portion. The light source(s) is/are optically-coupled to the optical element along a first optical axis. The one or more light sources emit excitation light, which interacts, via the optical element, with a sample. The sample includes a fluorophore that emits emission light in response to the excitation light. The image sensor is optically-coupled to the optical element along a second optical axis. The image sensor detects the emission light via the optical element.

20 Claims, 7 Drawing Sheets

(51) Int. Cl.
*G01J 3/10* (2006.01)
*G01N 21/64* (2006.01)
*G01J 3/02* (2006.01)
*G01N 21/88* (2006.01)

(52) U.S. Cl.
CPC ............ *G01J 3/10* (2013.01); *G01N 21/6456* (2013.01); *G01N 21/6458* (2013.01); *G02B 21/0036* (2013.01); *G02B 21/0048* (2013.01); *G02B 21/0076* (2013.01); *G02B 21/26* (2013.01); *G01J 2003/102* (2013.01); *G01J 2003/104* (2013.01); *G01N 2021/6471* (2013.01); *G01N 2021/8845* (2013.01)

(58) Field of Classification Search
CPC ...... G02B 21/26; G02B 21/367; G02B 23/12; G02B 21/002; G02B 21/008; G02B 21/362; G02B 21/22; G02B 21/245; G02B 21/0012; G02B 21/006; G02B 21/0088; G02B 21/368; G02B 13/16; G02B 21/0032; G02B 21/04; G02B 21/18; G02B 21/34; G02B 27/58; G02B 13/06; G02B 2027/0138; G02B 21/00; G02B 21/008; G02B 21/0016; G02B 21/0024; G02B 21/0056; G02B 21/0076; G02B 21/086; G02B 21/242; G02B 21/248; G02B 21/32; G02B 21/36; G02B 23/18; G02B 27/0018; G02B 27/283; G02B 7/04; G02B 13/0095; G02B 13/146; G02B 13/22; G02B 15/02; G02B 15/10; G02B 17/04; G02B 17/045; G02B 1/007; G02B 2027/0123; G02B 2027/0134; G02B 2027/014; G02B 21/0004; G02B 21/0036; G02B 21/0064; G02B 21/0096; G02B 21/02; G02B 21/10; G02B 21/12; G02B 21/14; G02B 21/20; G02B 21/364; G02B 23/00; G02B 23/02; G02B 23/04; G02B 23/08; G02B 23/16; G02B 25/001; G02B 26/007; G02B 26/06; G02B 27/00; G02B 27/0012; G02B 27/0025; G02B 27/01; G02B 27/0101; G02B 27/0172; G02B 27/141; G02B 27/56; G02B 5/003; G02B 5/126; G02B 5/201; G02B 6/06; G02B 7/002; G02B 7/006; G02B 7/026; G02B 7/06
USPC ......................................................... 359/363
See application file for complete search history.

(56) References Cited

U.S. PATENT DOCUMENTS

| | | |
|---|---|---|
| 2007/0247729 A1 | 10/2007 | Vaughnn et al. |
| 2008/0070322 A1 | 3/2008 | Hess et al. |
| 2009/0072171 A1 | 3/2009 | So et al. |

FOREIGN PATENT DOCUMENTS

| | | |
|---|---|---|
| WO | 2013/070485 | 5/2013 |
| WO | 2017/036893 | 3/2017 |

OTHER PUBLICATIONS

Soon Wook Kim et al., "Self-cleaning SiOx-embedded TiO2/SiO2 alternating multilayer," RSC Advances, vol. 5, pp. 94332-94337 (2015).

PATTERNED OPTIC FOR EPI-FLUORESCENCE COLLECTION

CROSS-REFERENCE TO RELATED APPLICATION

The present application claims the benefit of U.S. Patent Application No. 62/482,744, filed Apr. 7, 2017, the content of which is herewith incorporated by reference.

BACKGROUND

Optical detection of fluorescence light is used in a variety of medical diagnostic devices. Such devices may include, but are not limited to, clinical diagnostic devices, wearable devices, and scientific instruments. For samples that are thick or highly scattering, fluorescence light is often collected from the same side as the incident excitation light. Such methods of collecting fluorescence light are referred to as epi-fluorescence collection techniques.

SUMMARY

The present disclosure relates to systems and methods for epi-fluorescence collection. Namely, embodiments described herein include systems that include an optical element having various portions of: 1) a broadband anti-reflective (AR) coating that covers the entire fluorescence range of interest; and 2) a high-reflectivity (HR) coating operable to reflect excitation light wavelengths. In some embodiments, the HR coating may cover a small fraction of the area of the optical element. Furthermore, some example embodiments may include multiple HR coating regions on the optical element. In such a scenario, each HR coating region may be illuminated by a different laser spot (the spots can be of the same wavelength or of different wavelengths).

In a first aspect, a system is provided. The system includes an optical element. The optical element includes at least one high reflectivity (HR) coating portion and at least one anti-reflection (AR) coating portion. The system also includes one or more light sources optically-coupled to the optical element along a first optical axis. The one or more light sources emit excitation light. The excitation light interacts, via the optical element, with a sample. The sample includes a fluorophore that emits emission light in response to the excitation light. The system includes an image sensor optically-coupled to the optical element along a second optical axis, wherein the image sensor detects the emission light via the optical element.

In a second aspect, a method is provided. The method includes causing one or more light sources to emit excitation light. The excitation light interacts with an optical element. The optical element includes at least one high reflectivity (FIR) coating portion and at least one anti-reflection (AR) coating portion. Upon interaction with the HR coating portion of the optical element, the excitation light is reflected from an incident optical axis to a reflected optical axis as reflected excitation light. The reflected excitation light interacts with a sample. The sample includes a fluorophore that emits emission light in response to the reflected excitation light. The method includes detecting, by an image sensor, the emission light. The image sensor is coupled to the optical element along the reflected optical axis. At least a portion of the emission light is transmitted through the optical element to the image sensor.

In a third aspect, a method is provided. The method includes causing one or more light sources to emit excitation light. The excitation light interacts with an optical element. The optical element includes at least one high reflectivity (HR) coating portion and at least one anti-reflection (AR) coating portion. The excitation light is transmitted through the optical element along an optical transmission axis toward a sample. The sample includes a fluorophore that emits emission light in response to the excitation light. The emission light is reflected by the HR coating portion of the optical element toward an image sensor along an optical reflection axis. The method includes detecting, by the image sensor, the emission light. The image sensor is coupled to the optical element along the optical reflection axis.

Other aspects, embodiments, and implementations will become apparent to those of ordinary skill in the art by reading the following detailed description, with reference where appropriate to the accompanying drawings.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Epi-fluorescence collection techniques (e.g., methods that provide excitation light to, and collect fluorescence light from, the same side of a sample) are often utilized due to ease of alignment between excitation and collection pathways and a reduced number of optical elements. Epi-fluorescence also provides an ability to use scattering or opaque substrates under the sample of interest. In some devices that utilize epi-fluorescence light collection, there can often be a large difference between the numerical aperture (NA) used for the illumination (particularly when laser illumination is used) and the NA used for the collection. That is, incident laser light usually interacts with the optical system and the sample over a narrow range of angles. In contrast, the fluorescence light is emitted over a relatively wide range of angles. For illumination using laser light sources, high NA need only be needed in cases where very high spatial resolution is desired. In contrast, in collection, high NA is almost always desirable to maximize the collection of fluorescence photons, which are typically emitted substantially uniformly in solid angle.

Conventional epi-fluorescence devices separate the excitation light from the fluorescence light with a dichroic filter. However, devices using such dichroic filters have some drawbacks. First, because the transmission spectrum of the dichroic is dependent on the angle of incidence of the light, the collection efficiency will not be the same at different points in a given field of view. Second, it is often desirable to interrogate the sample using several different excitation wavelengths. As a possible result, fluorescence light may not be collected at wavelengths below the longest excitation wavelength, limiting options with regard to excitation sources, fluorophores, and optical elements. In cases where a multi-band dichroic filter is used, there may be gaps in the collected spectrum, which may substantially decrease the amount of collected fluorescence light. Furthermore, high-quality multi-band dichroic filters generally utilize a large number of dielectric layers, which make them expensive due to processing and material costs.

As another conventional alternative, a dichroic filter wheel may be used to accommodate multiple excitation lasers. In such a scenario, the wheel will select a dichroic filter having a transition wavelength as close as possible (on the red side) to the spectrum of the excitation source. This approach may increase the size of the system due to the presence of the mechanical filter wheel and its actuator/motor. Furthermore, such approaches typically use a rotation stage (which is often motorized), which may increase the cost of the system. Yet further, such devices do not accommodate simultaneous excitation of the sample using multiple sources at different wavelengths. In addition, such approaches do not correct for the angle-dependent transmission spectrum of dichroic filters.

Embodiments described herein include systems that take advantage of the large difference between the excitation and collection NA that exists in many epi-fluorescence collection scenarios. In an example embodiment, the system includes an optical element that has a broadband anti-reflective (AR) coating that covers the entire fluorescence range of interest. A portion of the optical element would have a high-reflectivity (HR) coating applied to it. This HR coating could be a metallic coating. The HR coating may include an inexpensive metallic coating (e.g., a sputtered aluminum and/or gold coating). For example, the HR coating may have reflection characteristics that are largely independent of incident angle. In some embodiments, the HR coating may cover a small fraction of the area of the optic (e.g., a few percent). The area of the HR coating may be based on a size of the excitation laser spot incident on it.

Some example embodiments may include multiple HR coating regions on the optical element. In such a scenario, each HR coating region may be illuminated by a different laser spot (the spots can be of the same wavelength or of different wavelengths).

Alternatively, or in addition to, the possibility of several discrete HR coating regions on the optical element, there could a line-shaped HR coating region on the optical element. In an example embodiment, a laser spot may be scanned along the line-shaped HR coating region and thus generate a 1-D scan of the sample. In some embodiments, several laser spots from different lasers could be scanned along this line to simultaneously excite the sample with multiple wavelengths. This could allow for very fast collection of fluorescence data with a fast galvo mirror in the excitation beam path for one dimension (fast axis) and the stage could move the sample in the other dimension for the slow axis. In the collection arm, the collected fluorescence could be descanned or a multipixel image sensor could be used.

In an alternative embodiment, the optical element could be made such that it is 99% HR and has only a few AR spots. In such a scenario, the excitation would be transmitted through the optical element and the fluorescence would be reflected to a collection detector.

Embodiments described herein may allow for simultaneous interrogation of a sample by multiple excitation lasers (which may be at different locations). Some embodiments may include building up a full two-dimensional fluorescence map. In such scenarios, the sample could be scanned in both axes perpendicular to the optical axis.

The described systems and methods may provide a cost-effective diagnostic device with multiple excitation lasers, optionally having lasers with different wavelengths. The current disclosure includes an optical element with a metal layer, which may be less complex and less expensive than multi-band dichroic filters that include dozens of dielectric layers.

The systems and methods described herein may relate to flow cytometry systems, as well as other fluorescence-based diagnostic techniques. As an example, the disclosure may relate to wearable devices, clinical devices, and/or surgical devices. Additionally or alternatively, systems and methods could also be used in digital pathology applications where high collection efficiency is desirable to acquire as many photons as possible before photobleaching processes arise.

In an example embodiment, the optical element may be patterned using semiconductor lithography techniques down to the micrometer size scale. For example, lithographically patterned HR coating regions could include 100×100 micron squares or circles. Additionally or alternatively, a line-shaped HR coating region could include a 1 mm×100 micron line. Larger, smaller, and differently-shaped HR coating regions are contemplated. As described elsewhere herein, multiple HR coating regions are possible. Furthermore, while small HR coating regions and their respective shapes are described herein, it will be understood that the anti-reflective and high-reflectivity portions could be "reversed" so that the majority of the optical element includes an HR coating with small AR coating regions.

In some embodiments, a system may be configured to accept differently-patterned optical elements. For example, an example embodiment may include a filter wheel with several optical elements, each having a different HR/AR pattern. Such different filters may be used to accommodate, for example, various sample excitation patterns and various numbers of excitation sources.

II. Example Systems

Figure 1:
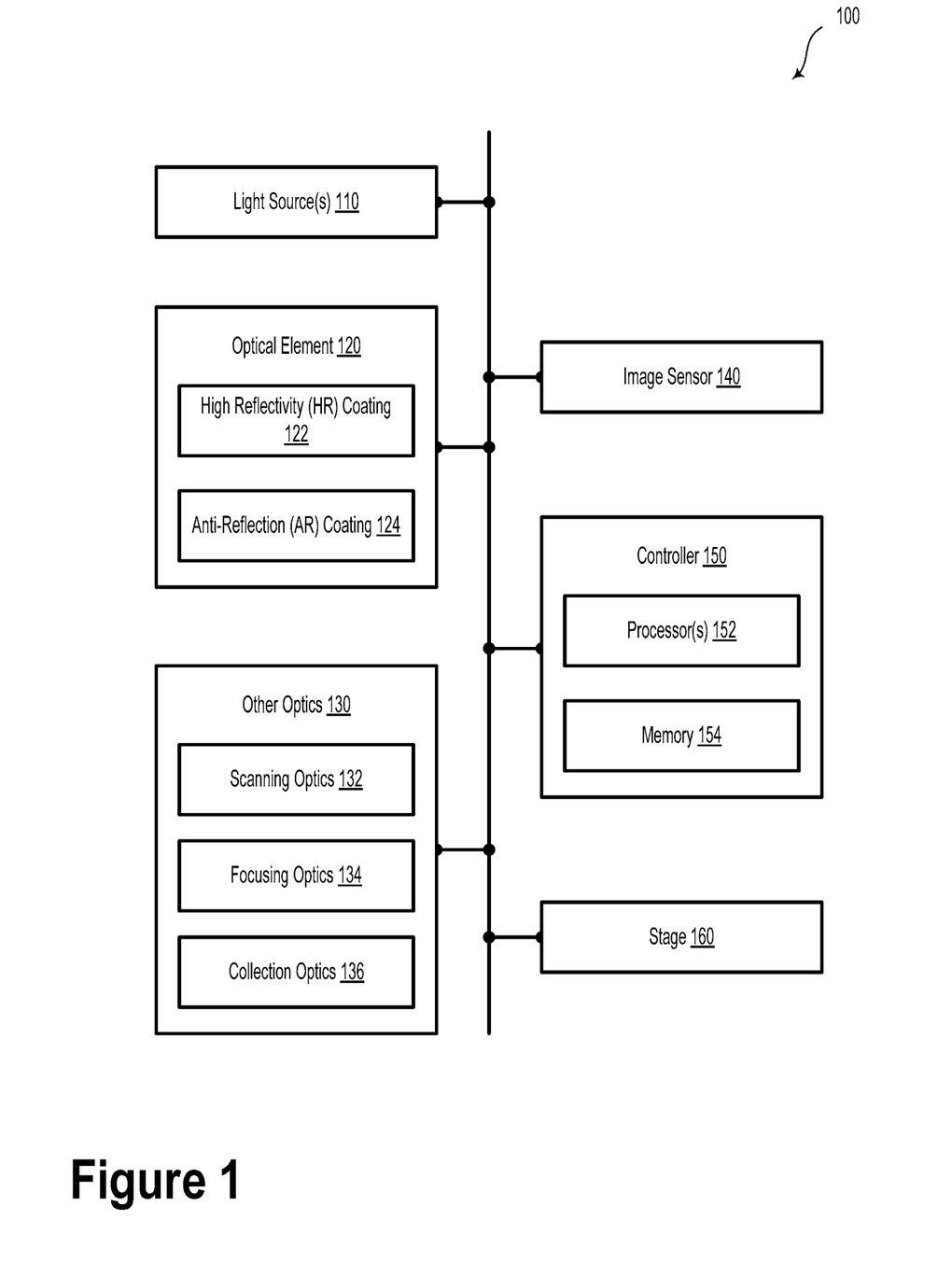
FIG. 1 illustrates a system, according to an example embodiment.

FIG. 1 illustrates a system 100, according to an example embodiment. System 100 may include, for example, a wearable device, a clinical device, or a surgical device. For example, system 100 may be a flow cytometry system, a fluorescence microscope, or another type of optical characterization system.

The system 100 includes one or more light sources 110. The one or more light sources 110 may include laser light sources. Furthermore, the light sources 110 are configured to emit excitation light. In an example embodiment, the light sources 110 may provide laser light having a Gaussian beam profile and a relatively small beam spread (e.g., 100 microns). That is, the excitation light emitted by the light sources 110 may interact with other elements of system 100 over a relatively narrow range of angles.

The system 100 also includes an optical element 120. The optical element 120 includes at least one high reflectivity (HR) coating portion 122 and at least one anti-reflection (AR) coating portion 124. In an example embodiment, the HR coating portion 122 may include a metal coating (e.g., aluminum, silver, and/or gold). Additionally or alternatively, the HR coating portion 122 may include a dielectric layer ($TiO_2$, $TaO_2$, etc.). For example, the HR coating portion 122 may provide a highly reflective surface over a broad range of optical wavelengths.

In some embodiments, the AR coating portion 124 may include a dielectric coating. For example, a single layer of $MgF_2$ could be used. In some embodiments, the AR coating portion 124 may be configured to be substantially transparent with regard to certain wavelengths of light and absorbing or reflective to other wavelengths (e.g., a bandpass or bandstop filter). Additionally or alternatively, the AR coating portion 124 may be configured to be substantially transparent to a wide range of optical wavelengths.

The choice of materials and coating layer thickness(es) may be based on the width and depth of the reflection peak (HR) or transmission peak (AR). AR coatings could have bandpass wavelength "windows" that are hundreds of nanometers wide.

While the present disclosure describes the HR coating and AR coating as including certain materials, it will be understood that other materials and methods of manufacture are possible to provide optical elements having substantially reflective or transparent properties. As used herein, "high reflectivity coatings" may include materials and coatings that have reflectance greater than 90% at a given wavelength of light. Furthermore, as used herein, "anti-reflection coatings" may include materials and coatings that provide lower reflectivity than an uncoated substrate (e.g., ~4-5% for uncoated glass) at a given wavelength of light. For example, the AR coatings described herein may provide reflectivity less than 1% over a wavelength range between 350-700 nanometers, however other reflectivity values less than 4% and other wavelength ranges are possible and contemplated herein.

The one or more light sources 110 are optically-coupled to the optical element 120 along a first optical axis.

In example embodiments, system 100 interacts with a sample. Namely, the system 100 may illuminate the sample with excitation light emitted by the one or more light sources 110. The excitation light interacts with the optical element 120 prior to interacting with the sample. The sample includes a fluorophore that emits emission light in response to the excitation light. In example embodiments, the sample could include, but is not limited to, human or animal tissues or another type of object suitable for fluorescence characterization.

System 100 additionally includes an image sensor 140, which is optically-coupled to the optical element 120 along a second optical axis. That is, in example embodiments, the emission light (generated from fluorophores present in the sample) interacts with the optical element 120 through reflection and/or transmission interactions. The image sensor 140 is configured to detect the emission light via the optical element 120. In an example embodiment, the image sensor 140 may include a multi-pixel camera sensor, although other types of photodetector devices, in individual or array configurations, are possible.

In an example embodiment, the HR coating portion 122 may be configured to reflect the excitation light such that it interacts with the sample. In such a scenario, the AR coating portion 124 is configured to be substantially transparent to the emission light.

Alternatively, the HR coating portion 122 may be configured to reflect the emission light so as to direct it toward the image sensor 140. In such a scenario, the AR coating portion 124 is configured to be substantially transparent to the excitation light.

In some embodiments, the HR coating portion 122 may include a plurality of HR coating regions on the optical element 120. For example, several HR coating regions could be arranged along a first surface of the optical element 120. In such a scenario, the plurality of HR coating regions could include two to twenty HR coating regions 122, or more.

In such embodiments, the one or more light sources 110 may include a plurality of light sources. Specifically, each light source 110 of the plurality of light sources emits excitation light toward a respective HR coating region 122 on the optical element. In such a scenario, each light source 110 of the plurality of light sources could be operable to emit excitation light at a respective excitation wavelength. That is, each light source 110 may emit excitation light at a different excitation wavelength.

In example embodiments, the one or more light sources 110, the optical element 120, and the image sensor 140 are arranged in an epi-fluorescence optical microscopy configuration with respect to the sample. That is, the system 100 may provide excitation light from the light sources 110 that is incident on a first surface of the sample. In such scenarios, fluorophores in the sample may emit emission light into the environment over a broad angle range (e.g., within a half sphere defined by the first surface of the sample). Image sensor 140 may collect at least a portion of the emission light from the first surface of the sample. In other words, the excitation of the sample and fluorescence light collection may take place on the same side of the sample.

In some embodiments, the system 100 may include other optics 130 such as scanning optics 132, focusing optics 134, and/or collection optics 136. For example, scanning optics 132 may be optically-coupled to the one or more light sources 110. In such a scenario, the scanning optics 132 may be configured to scan excitation light onto the sample along at along at least a first sample axis (along the x-axis) parallel to a surface of the sample. The scanning optics 132 may include at least one galvanometer mirror.

Some example embodiments include a stage 160, which may support the sample. In an example, stage 160 may be motorized so as to move the sample along at least one axis. In such scenarios, the stage 160 may be configured to move the sample along at least a second sample axis (e.g., along the y-axis) parallel to a surface of the sample. In other embodiments, the stage 160 may be configured to move the sample along a plane parallel to the surface of the sample (e.g., in x and y) and/or along a plane perpendicular to the first optical axis or the second optical axis. In yet further embodiments, the stage 160 may be configured to move the sample in all three spatial dimensions (in x, y, and z). In some embodiments, a position of stage 160 may be manually adjustable.

In some embodiments, system 100 may include a controller 150 having at least one processor 152 and a memory 154. The one or more processors 152 may include a general-purpose processor or a special-purpose processor (e.g., digital signal processors, application specific integrated circuits, etc.). The one or more processors 152 may be configured to execute computer-readable program instructions that are stored in the memory 154. As such, the one or more processors 152 may execute the program instructions to provide at least some of the functionality and operations described herein.

The memory 154 may include or take the form of one or more non-transitory computer-readable storage media that may be read or accessed by the one or more processors 152. The one or more computer-readable storage media can include volatile and/or non-volatile storage components, such as optical, magnetic, organic or other memory or disc storage, which may be integrated in whole or in part with at least one of the one or more processors 152. In some embodiments, the memory 154 may be implemented using a single physical device (e.g., one optical, magnetic, organic or other memory or disc storage unit), while in other embodiments, the memory 154 can be implemented using two or more physical devices.

As noted, the memory 154 may include computer-readable program instructions and additional data, such as information about the elements of system 100 and/or the sample. As such, the memory 154 may include program instructions to perform or facilitate some or all of the operations and functionality described herein.

In example embodiments, the operations may include causing the one or more light sources 110 to emit the excitation light and detecting, by the image sensor 140, the emission light.

Furthermore, in scenarios involving scanning optics 132, the operations may also include adjusting the scanning optics 132 so as to scan the sample with excitation light along at least a first sample axis parallel to a surface of the sample.

In example embodiments that include a stage 160, the operations may include adjusting the stage 160 so as to move the sample along at least a second sample axis parallel to a surface of the sample.

Figure 2A:
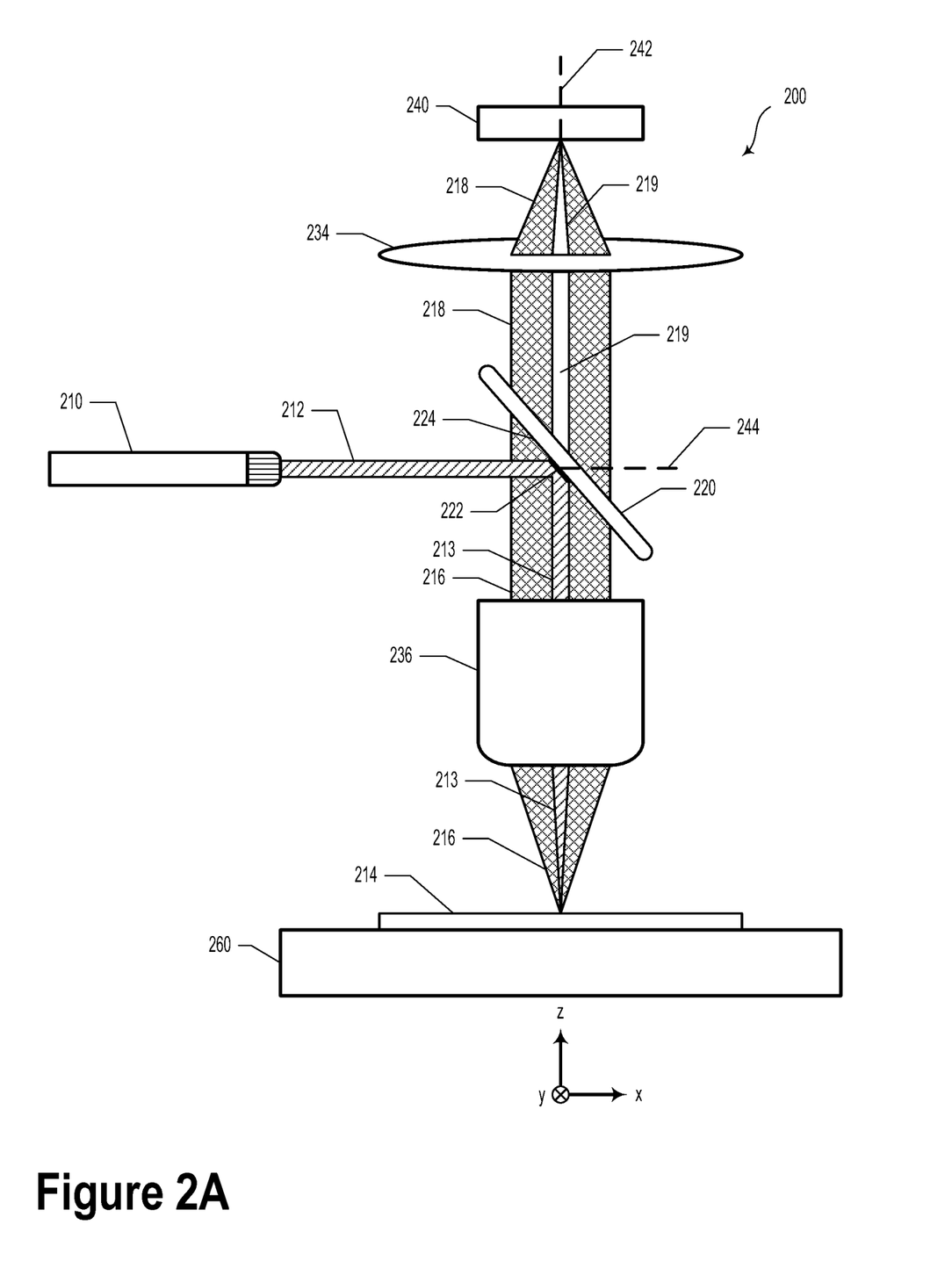
FIG. 2A illustrates a system, according to an example embodiment.

FIG. 2A illustrates a system 200, according to an example embodiment. System 200 may be similar or identical to system 100 as illustrated and described in reference to FIG. 1. For example, system 200 may include a light source 210 that emits excitation light 212 along a first optical axis 244. The emitted excitation light 212 may interact with an optical element 220. In particular, the excitation light 212 may be substantially reflected by a HR coating region 222 located along a surface of the optical element 220. The excitation light 212 may be reflected toward a sample 214 in an axis along, or parallel to, a second optical axis 242.

The reflected excitation light 213 may be focused by an optical objective 236, which may be a focusing lens and/or a collection optic. The focused excitation light 213 may interact with sample 214. For example, the reflected excitation light 213 may interact with fluorophores located within the sample 214. In response to interactions with the reflected excitation light 213, the fluorophores may emit emission light 216. Example embodiments may include fluorophores such as the Brilliant Violet (BV) or Brilliant Violet UV (BUV) dyes from BioLegend or Alexa Fluor Dyes. It will be understood that other types of fluorophores may be utilized in conjunction with the systems and methods described herein. In some embodiments, the excitation wavelength of such fluorophores could be 355 nanometers or 405 nanometers, but other excitation wavelengths are contemplated. In some embodiments, the emission light 216 may have an emission wavelength that is a longer wavelength than the excitation wavelength.

The emission light 216 may be collected using the optical objective 236 or another type of optical collection element (e.g., collection optics 136). In some embodiments, the optical objective 236 may substantially collimate the emission light 216.

The emission light 216 may impinge upon, and interact with, the optical element 220. For example, a first portion of the emission light 216 may interact with the HR coating portion 222 and a second portion of the emission light 216 may interact with the AR coating portion 224. The first portion of emission light 216 that interacts with the HR coating portion 222 may be reflected or otherwise blocked or absorbed. The second portion of the emission light 216 that interacts with the AR coating portion 224 may be substantially transmitted through the optical element 220 as transmitted emission light 218. In other words, through interactions with the optical element 220, a portion of the emission light may be blocked or reflected by the optical element 220. This may result in an attenuated region 219 in the emission light that is transmitted through the optical element 220. In the attenuated region 219, the emission light may be absent or may be present at a substantially lower intensity than in the transmitted emission light 218.

As illustrated in FIG. 2A, the emission light 218 may interact with a focusing optic 234. In some embodiments, the focusing optic 234 may be configured to provide an image on an image sensor 240. In other embodiments (e.g., involving low fluorescence output and/or single photon counting), the focusing optic 234 may be configured to focus the emission light 218 onto a photodetector device, which could include a high sensitivity single-pixel detector such as a photomultiplier tube or avalanche photodiode.

Figure 2B:
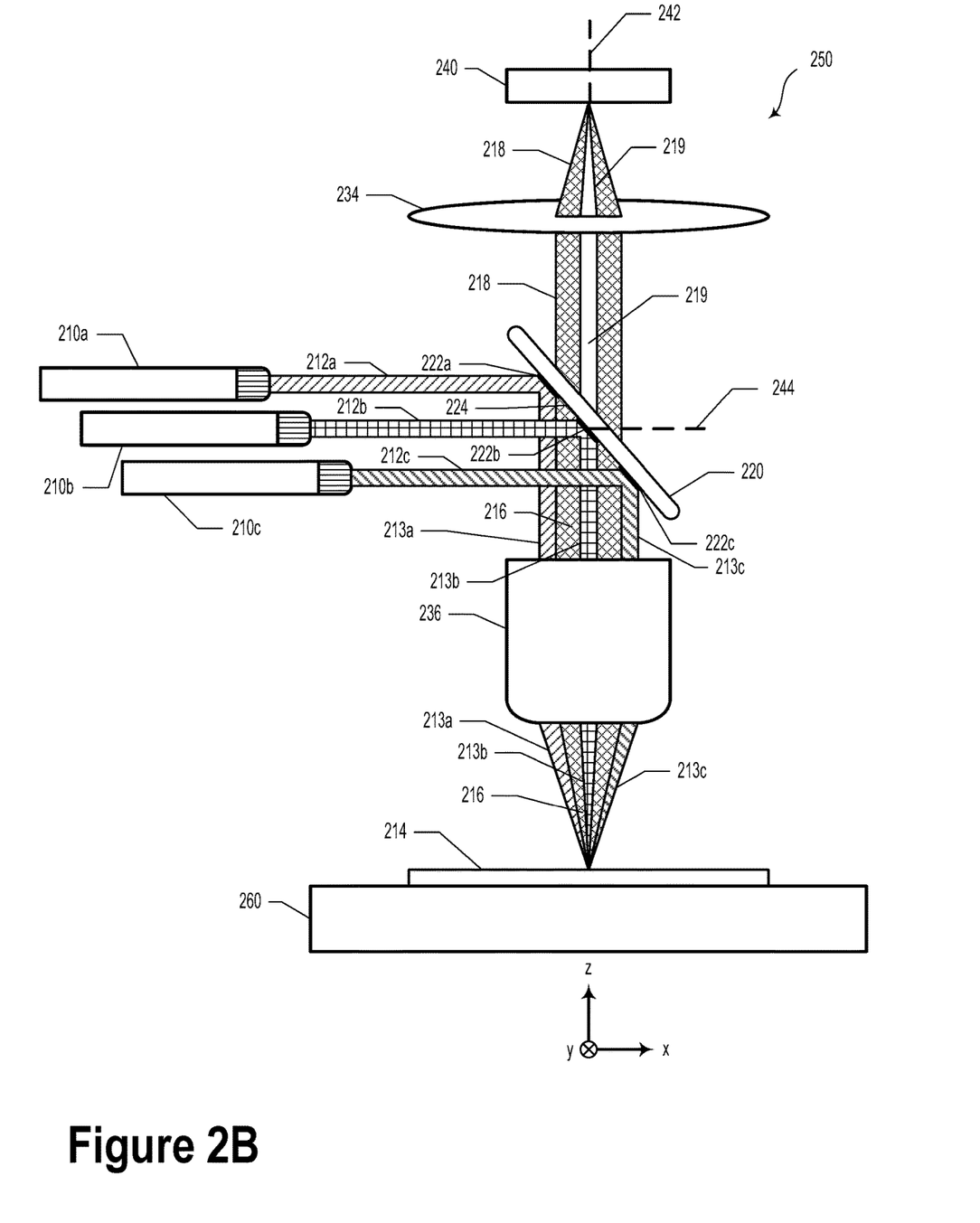
FIG. 2B illustrates a system, according to an example embodiment.

FIG. 2B illustrates a system 250, according to an example embodiment. System 250 may be similar or identical to systems 100 and/or 200, as illustrated and described with reference to FIGS. 1 and 2A, but with a plurality of light sources.

As illustrated in FIG. 2B, system 250 may include an optical element 220 having a plurality of HR coating portions 222a, 222b, and 222c. System 250 may additionally include a plurality of light sources 210a, 210b, and 210c. In an example embodiment, light source 210a may be configured to emit excitation light 212a having a first excitation wavelength. Likewise, light sources 210b and 210c may be configured to emit excitation light 212b and 212c having a second and third excitation wavelength, respectively.

The respective excitation light 212a, 212b, and 212c may impinge on differing locations along a surface of the optical element 220. For example, excitation light 212a may interact with HR coating portion 222a, excitation light 212b may interact with HR coating portion 222b, and excitation light 212c may interact with HR coating portion 222c.

The interactions between the excitation light and the respective HR coating portions may provide reflected excitation light 213a, 213b, and 213c, which may be directed toward sample 214. For example, an optical element 236 may focus the respective excitation light beams 213a, 213b, and 213c on a particular location on the sample 214. In such a scenario, a given sample location can be simultaneously illuminated by multiple excitation wavelengths.

In an example embodiment, system 250 may be operable to characterize samples that include a plurality of different fluorophores. For example, sample 214 may include three different fluorophores that correspond to the three different excitation wavelengths provided by light sources 210a, 210b, and 210c.

In some embodiments, the light sources 210a, 210b, and 210c may be operated in sequential or parallel fashion. That is, the light sources 210a, 210b, and 210c may provide respective excitation light 212a, 212b, and 212c at different times or simultaneously.

While three HR coating portions and three light sources are illustrated in FIG. 2B, a greater or fewer number of HR coating portions and light sources could be used and are contemplated herein. Furthermore, while the light sources 210a, 210b, and 210c are illustrated as being in a certain spatial configuration, it will be understood that the light sources 210a-c could be arranged at different locations and need not have parallel angles of incidence to the optical element 220 and the respective HR coating portions 222a-c. For instance, due to space constraints and/or form factor, light sources 210a-c could be spatially staggered and the excitation light 212a-c may interact with the respective HR coating portions 222a-c with different angles of incidence. For example, in some embodiments, a plurality of light sources (e.g., four laser diodes) could emit light along different angles of incidence so as to impinge on a single HR coating portion (e.g., HR coating portion 222b) on the optical element 220.

Figure 2C:
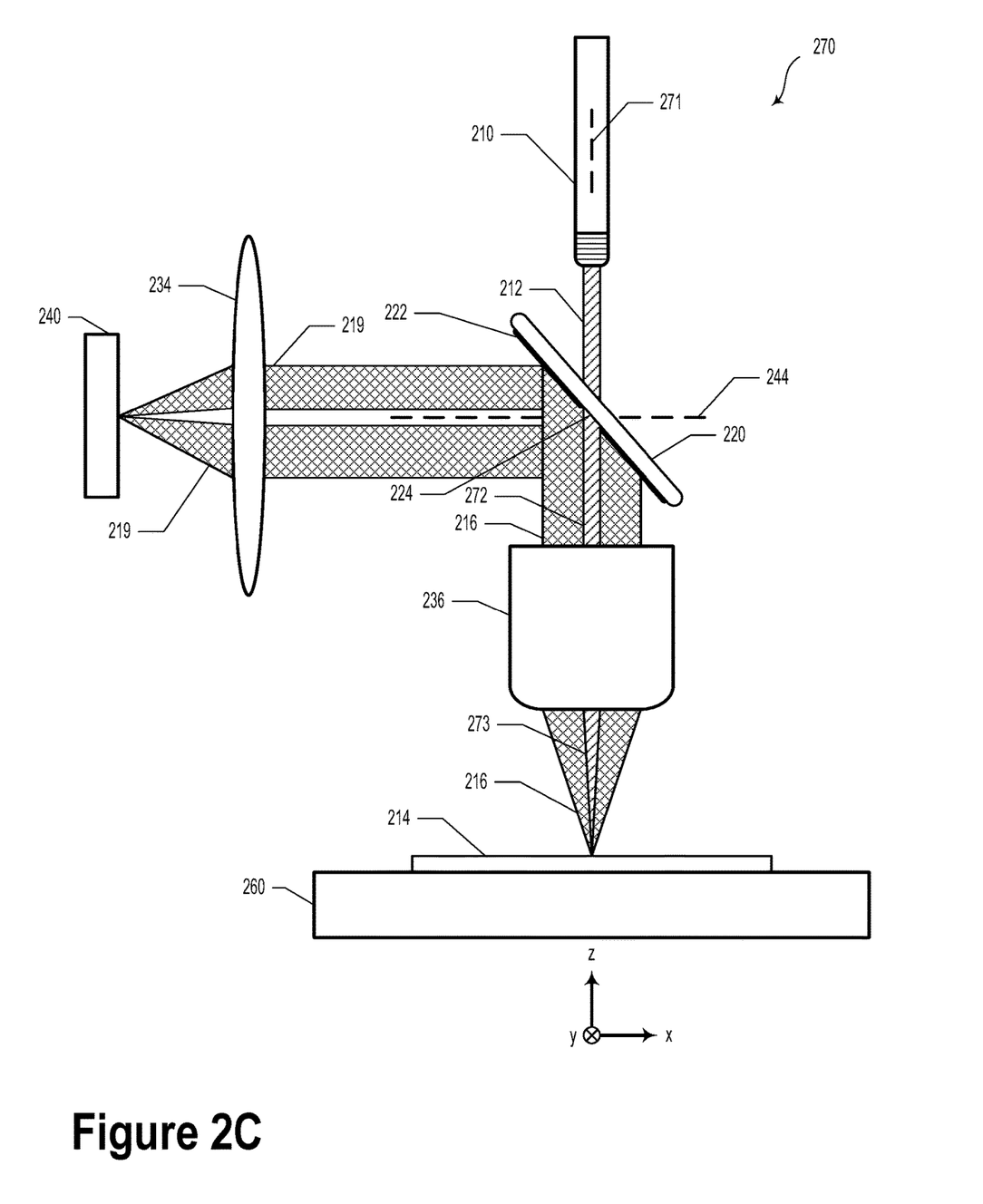
FIG. 2C illustrates a system, according to an example embodiment.

FIG. 2C illustrates a system 270, according to an example embodiment. System 270 may be similar or identical to systems 100, 200, and/or 250, as illustrated and described with reference to FIG. 1, 2A, or 2B. In an example, system 270 may represent an alternative configuration of systems 200 or 250.

System 270 may include a light source 210 that emits excitation light 212 along a first optical axis 271. The emitted excitation light 212 may interact with an optical element 220. In particular, the excitation light 212 may be substantially transmitted by an AR coating region 224 located along a surface of the optical element 220. The excitation light 212 may be transmitted toward a sample 214 in an axis along, or parallel to, the first optical axis 271.

The transmitted excitation light 272 may be focused by an optical objective 236, which may be a focusing lens and/or a collection optic. The focused excitation light 273 may interact with sample 214. For example, the focused excitation light 273 may interact with fluorophores located within the sample 214. In response to interactions with the focused excitation light 273, the fluorophores may emit emission light 216. In some embodiments, the emission light 216 may have an emission wavelength that is different from the excitation wavelength.

The emission light 216 may be collected using the optical objective 236 or another type of optical collection element (e.g., collection optics 136). In some embodiments, the optical objective 236 may substantially collimate the emission light 216.

The emission light 216 may impinge upon, and interact with, the optical element 220. For example, a first portion of the emission light 216 may interact with the HR coating portion 222 and a second portion of the emission light 216 may interact with the AR coating portion 224. The first portion of emission light 216 that interacts with the HR coating portion 222 may be reflected toward image sensor 240. The second portion of the emission light 216 that interacts with the AR coating portion 224 may be substantially transmitted through the optical element 220.

As illustrated in FIG. 2C, the reflected emission light 219 may interact with a focusing optic 234. In some embodiments, the focusing optic 234 may be configured to provide an image on an image sensor 240. In other embodiments (e.g., involving low fluorescence output and/or single photon counting), the focusing optic 234 may be configured to focus the emission light 219 onto a photodetector device.

Figure 3:
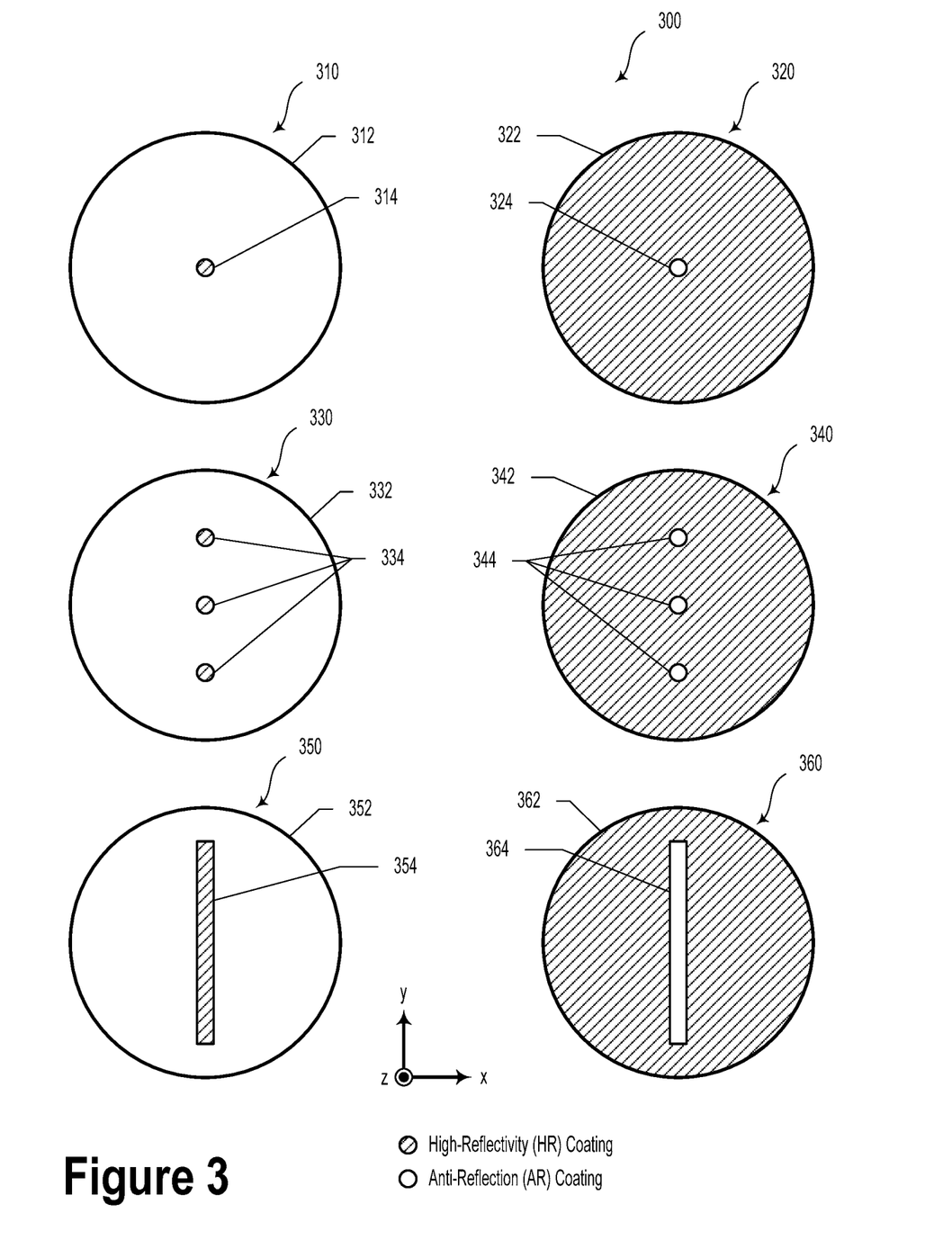
FIG. 3 illustrates various optical elements, according to example embodiments.

FIG. 3 illustrates various optical elements 300, according to example embodiments. The various optical elements 300 may represent examples of optical elements 120 or 220 as illustrated and described in reference to FIGS. 1, 2A, 2B, and 2C. Optical element 310 includes a single centrally-located HR coating portion 314. The remaining area of optical element 310 includes an AR coating portion 312. Optical element 320 includes a reverse-toned embodiment of optical element 310. Namely, optical element 320 includes a single centrally-located AR coating portion 324. The remaining area of optical element 320 includes an HR coating portion 322.

In an example embodiment, the HR coating portion 314 may have circular shape with a diameter between 50 microns to 1 millimeter. However, other sizes and shapes of the HR coating portion 314 are possible. Likewise, AR coating portion 324 may have circular shape with a diameter between 50 microns to 1 millimeter. However, other sizes and shapes of the AR coating portion 324 are possible.

Optical element 330 includes a plurality of HR coating portions 334. The remaining area of optical element 330 includes an AR coating portion 332. Optical element 340 includes a reverse-toned embodiment of optical element 330. Namely, optical element 340 includes a plurality of AR coating portions 344. The remaining area of optical element 340 includes an HR coating portion 342.

Optical element 350 includes an HR coating portion 354 having an elongate shape. For example, the HR coating portion 354 could include a line-shaped segment. In such a scenario, a laser spot could be scanned across the HR coating portion 354 so as to generate a 1-dimensional scan of the sample. In some embodiments, several laser spots from different lasers could be scanned along this line to simultaneously excite the sample with multiple wavelengths. The remaining area of optical element 350 includes an AR coating portion 352. Optical element 360 includes a reverse-toned embodiment of optical element 350. Namely, optical element 360 includes an AR coating portion 364 having an elongate shape. The remaining area of optical element 360 includes an HR coating portion 362.

While FIG. 3 illustrates various optical elements 300 having certain arrangements of AR coating and HR coating portions on the respective optical elements, it will be understood that other combinations and arrangements of AR coatings and HR coatings are contemplated and possible.

The various optical elements 300 may be fabricated using semiconductor manufacturing techniques, such as optical and electron beam lithography. As an example, HR coating regions could include squares, circles, and/or rectangles with critical dimensions of 100 microns or smaller.

In some embodiments, several different optical elements, each having different HR/AR patterns (e.g., optical elements 310, 320, 330, 340, 350, and 360) could be included on a filter wheel. In such a scenario, the filter wheel could be manually or automatically actuated so as to provide a desired HR/AR pattern along the optical axis. In an example embodiment, controller 150 may automatically select an HR/AR pattern from a plurality of HR/AR patterns on the filter wheel. In such a scenario, selecting the HR/AR pattern may be based on a number of light sources, a type and number of different fluorophores in the sample, and the detection capabilities of the image sensor. Other considerations are possible and contemplated.

III. Example Methods

Figure 4:
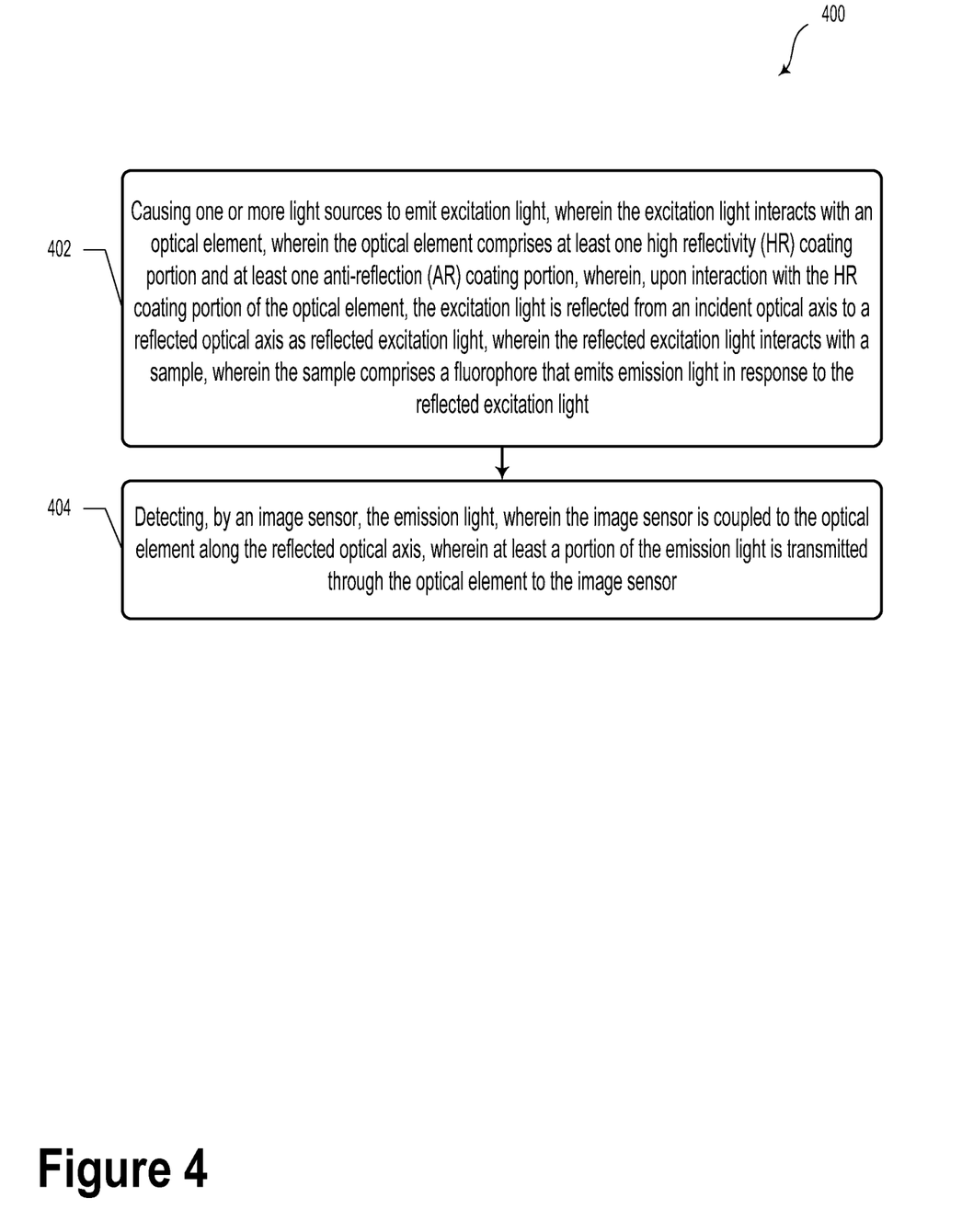
FIG. 4 illustrates a method, according to an example embodiment.

FIG. 4 illustrates a method 400, according to an example embodiment. The method 400 may include various blocks or steps. The blocks or steps may be carried out individually or in combination. The blocks or steps may be carried out in any order and/or in series or in parallel. Further, blocks or steps may be omitted or added to method 400.

The blocks of method 400 may control, include, and/or involve elements of systems 100, 200, 250, or 270, or the various optical elements 300, as illustrated and described in reference to FIGS. 1, 2A, 2B, 2C, and 3. In some embodiments, some or all blocks of method 400 may be carried out by controller 150.

Block 402 includes causing one or more light sources to emit excitation light. The excitation light interacts with an optical element, which includes at least one high reflectivity (HR) coating portion and at least one anti-reflection (AR) coating portion.

Upon interaction with the HR coating portion of the optical element, the excitation light is reflected from an incident optical axis to a reflected optical axis as reflected excitation light. The reflected excitation light interacts with a sample, which includes a fluorophore that emits emission light in response to the reflected excitation light.

Block 404 includes detecting the emission light using an image sensor. The image sensor is coupled to the optical element along the reflected optical axis. At least a portion of the emission light is transmitted through the optical element to the image sensor.

Optionally, method 400 may include adjusting scanning optics so as to scan the sample with excitation light along at along at least a first axis parallel to a surface of the sample. In such a scenario, the scanning optics are optically coupled to the one or more light sources.

Additionally or alternatively, the method 400 may include adjusting a stage supporting the sample so as to move the sample along at least a second axis parallel to a surface of the sample. In such a scenario, the sample could be scanned in both axes perpendicular to the optical axis (e.g., along the x-y plane). Such embodiments may provide a way to build up a full two-dimensional fluorescence map of the sample.

Figure 5:
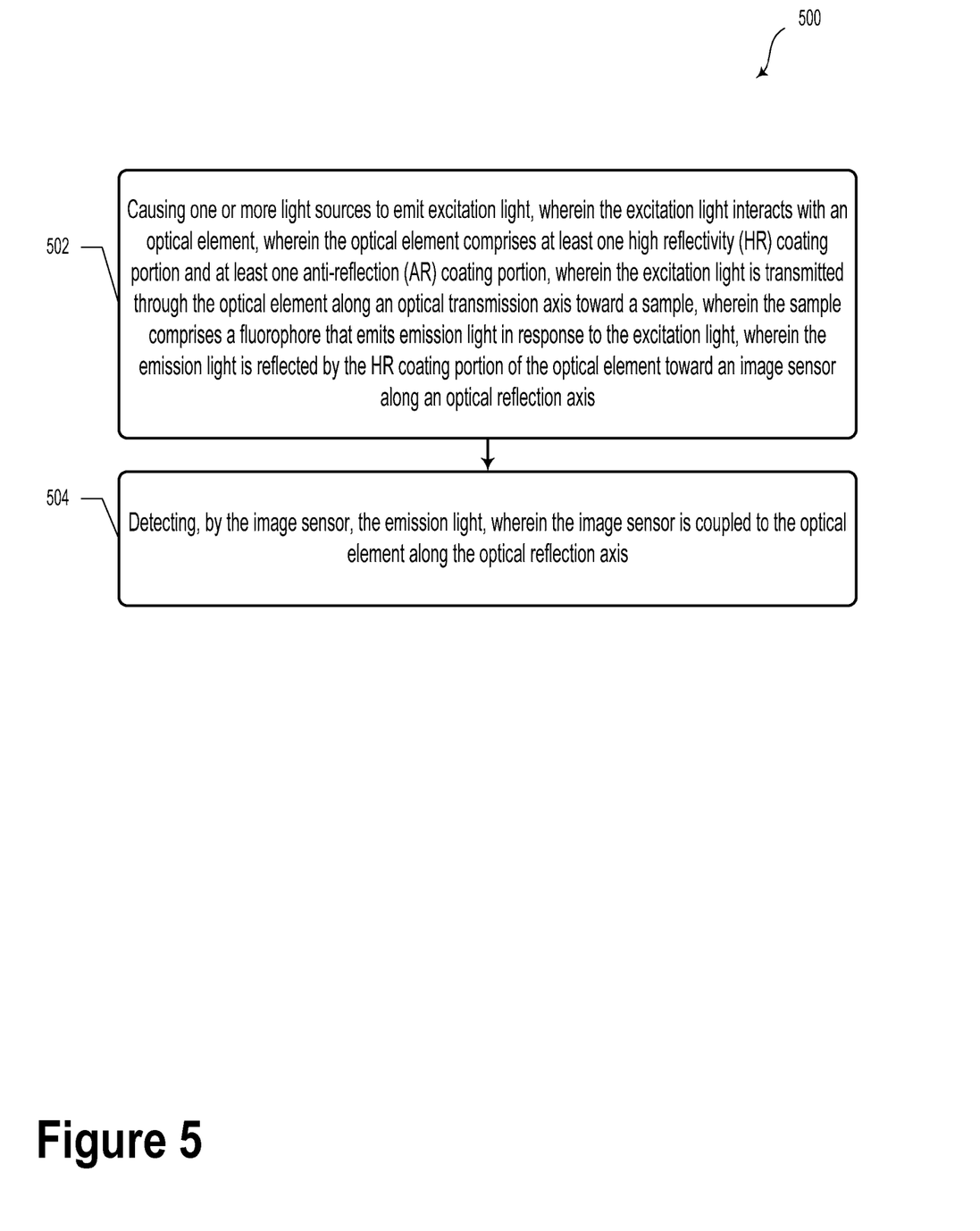
FIG. 5 illustrates a method, according to an example embodiment.

FIG. 5 illustrates a method 500, according to an example embodiment. The method 500 may include various blocks or steps. The blocks or steps may be carried out individually or in combination. The blocks or steps may be carried out in any order and/or in series or in parallel. Further, blocks or steps may be omitted or added to method 500.

The blocks of method 500 may control, include, and/or involve elements of systems 100, 200, 250, or 270, or the various optical elements 300, as illustrated and described in reference to FIGS. 1, 2A, 2B, 2C, and 3. In some embodiments, some or all blocks of method 500 may be carried out by controller 150.

Block 502 includes causing one or more light sources to emit excitation light. The excitation light interacts with an optical element, which includes at least one high reflectivity (HR) coating portion and at least one anti-reflection (AR) coating portion. The excitation light is transmitted through the optical element along an optical transmission axis toward a sample, which includes a fluorophore that emits emission light in response to the excitation light. The emission light is reflected by the HR coating portion of the optical element toward an image sensor along an optical reflection axis.

Block 504 includes detecting, by the image sensor, the emission light. The image sensor is coupled to the optical element along the optical reflection axis.

Method 500 optionally includes adjusting scanning optics optically-coupled to the one or more light sources so as to scan the sample with excitation light along at along at least a first axis parallel to a surface of the sample. Additionally or alternatively, method 500 may include adjusting a stage supporting the sample so as to move the sample along at least a second axis parallel to a surface of the sample. As described elsewhere herein, the sample could be scanned in both axes perpendicular to the optical axis (e.g., along the x-y plane). Such embodiments may provide a way to build a full two-dimensional fluorescence map of the sample.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
   an optical element having a first side and a second side opposite the first side, wherein the optical element comprises at least one high reflectivity (HR) coating portion in a first area on the first side of the optical element and at least one anti-reflection (AR) coating portion in a second area on the first side of the optical element, wherein the first and second areas are different areas on the first side of the optical element;

one or more light sources optically-coupled to the optical element along a first optical axis, wherein the one or more light sources emit excitation light, wherein the excitation light interacts, via the optical element, with a sample, wherein the sample comprises a fluorophore that emits emission light in response to the excitation light; and an image sensor optically-coupled to the optical element along a second optical axis, wherein the image sensor detects the emission light via the optical element.

2. The system of claim 1, wherein the HR coating portion is configured to reflect the excitation light so as to interact with the sample, wherein the AR coating portion is substantially transparent to the emission light.

3. The system of claim 1, wherein the HR coating portion is configured to reflect the emission light so as to direct it toward the image sensor, wherein the AR coating portion is substantially transparent to the excitation light.

4. The system of claim 1, wherein the one or more light sources, the optical element, and the image sensor are arranged in an epi-fluorescence optical microscopy configuration with respect to the sample.

5. The system of claim 1, wherein the HR coating portion comprises a metal coating.

6. The system of claim 1, wherein the AR coating portion comprises a dielectric coating.

7. The system of claim 1, further comprising a stage, wherein the stage supports the sample, wherein the stage moves the sample along at least a second sample axis parallel to a surface of the sample.

8. The system of claim 1, wherein the image sensor comprises a multi-pixel camera sensor.

9. The system of claim 1, further comprising scanning optics optically coupled to the one or more light sources, wherein the scanning optics scan excitation light on the sample along at along at least a first sample axis parallel to a surface of the sample.

10. The system of claim 9, wherein the scanning optics comprises at least one galvanometer mirror.

11. The system of claim 1, further comprising a controller having at least one memory and at least one processor, wherein the at least one processor executes instructions stored in the at least one memory so as to carry out operations, the operations comprising:

causing the one or more light sources to emit the excitation light; and detecting, by the image sensor, the emission light.

12. The system of claim 11, further comprising scanning optics, wherein the scanning optics are optically coupled to the one or more light sources, wherein the operations comprise:

adjusting the scanning optics so as to scan the sample with excitation light along at least a first sample axis parallel to a surface of the sample.

13. The sample of claim 11, further comprising a stage, wherein the stage supports the sample, wherein the operations further comprise:

adjusting the stage so as to move the sample along at least a second sample axis parallel to a surface of the sample.

14. The system of claim 1, wherein the HR coating portion comprises a plurality of HR coating regions on the optical element.

15. The system of claim 14, wherein the one or more light sources comprises a plurality of light sources, wherein each light source of the plurality of light sources emits excitation light toward a respective HR coating region on the optical element.

16. The system of claim 15, wherein each light source of the plurality of light sources emits excitation light at a respective excitation wavelength.

17. A method comprising:

causing one or more light sources to emit excitation light, wherein the excitation light interacts with an optical element having a first side and a second side opposite the first side, wherein the optical element comprises at least one high reflectivity (HR) coating portion in a first area on the first side of the optical element and at least one anti-reflection (AR) coating portion in a second area on the first side of the optical element, wherein the first and second areas are different areas on the first side of the optical element, wherein, upon interaction with the HR coating portion of the optical element, the excitation light is reflected from an incident optical axis to a reflected optical axis as reflected excitation light, wherein the reflected excitation light interacts with a sample, wherein the sample comprises a fluorophore that emits emission light in response to the reflected excitation light; and detecting, by an image sensor, the emission light, wherein the image sensor is coupled to the optical element along the reflected optical axis, wherein at least a portion of the emission light is transmitted through the optical element to the image sensor.

18. The method of claim 17 further comprising at least one of:

adjusting scanning optics so as to scan the sample with excitation light along at along at least a first axis parallel to a surface of the sample, wherein the scanning optics are optically coupled to the one or more light sources; or adjusting a stage so as to move the sample along at least a second axis parallel to a surface of the sample, wherein the stage supports the sample.

19. A method comprising:

causing one or more light sources to emit excitation light, wherein the excitation light interacts with an optical element having a first side and a second side opposite the first side, wherein the optical element comprises at least one high reflectivity (HR) coating portion in a first area on the first side of the optical element and at least one anti-reflection (AR) coating portion in a second area on the first side of the optical element, wherein the first and second areas are different areas on the first side of the optical element, wherein the excitation light is transmitted through the optical element along an optical transmission axis toward a sample, wherein the sample comprises a fluorophore that emits emission light in response to the excitation light, wherein the emission light is reflected by the HR coating portion of the optical element toward an image sensor along an optical reflection axis; and detecting, by the image sensor, the emission light, wherein the image sensor is coupled to the optical element along the optical reflection axis.

20. The method of claim 19 further comprising at least one of:

adjusting scanning optics so as to scan the sample with excitation light along at along at least a first axis parallel to a surface of the sample, wherein the scanning optics are optically coupled to the one or more light sources; or adjusting a stage so as to move the sample along at least a second axis parallel to a surface of the sample, wherein the stage supports the sample.

\* \* \* \* \*